United States Patent [19]
Gallagher

[11] Patent Number: 6,052,874
[45] Date of Patent: Apr. 25, 2000

[54] BOAT-LINE TIE-OFF APPARATUS

[76] Inventor: William P. Gallagher, 336 Jennings Rd., Manahawkin, N.J. 08050

[21] Appl. No.: 09/329,380

[22] Filed: Jun. 10, 1999

[51] Int. Cl.[7] .................................................... F16G 11/00
[52] U.S. Cl. ........................ 24/135 R; 403/283; 24/115 R
[58] Field of Search .............................. 24/115 G, 115 R, 24/132 R, 135 R, 136 R, 136 B, 265 BC, 265 EC, 115 N, 514, 515, 516, 132 WL, 265 R, 525; 403/319, 283; 411/336, 335, 338, 339

[56] References Cited

U.S. PATENT DOCUMENTS

| | | | |
|---|---|---|---|
| 761,396 | 5/1904 | Perters | 403/283 |
| 1,867,084 | 7/1932 | Lewis et al. | 24/136 B X |
| 4,368,999 | 1/1983 | Morel | 403/283 |
| 4,455,717 | 6/1984 | Gray | 24/115 R |
| 5,340,258 | 8/1994 | Simon | 411/339 X |

*Primary Examiner*—Anthony Knight
*Assistant Examiner*—Robert J. Sandy
*Attorney, Agent, or Firm*—Charles I. Brodsky

[57] ABSTRACT

As a preferred alternative to whipping a boat-line with tape or a wax material to limit wearing and unraveling over time, the apparatus of the invention affords a secure, more attractive appearance through the use of a pair of cylinders, one of which receives the boat-line, and the other of which threads over it, with the effective screwing of the two together additionally producing a force upon a series of compressible fingers that extend inwardly from the outside surface of the first cylinder in clamping onto and holding the boat-line in position. The two cylinders may be capped in providing a finished-off appearance to the construction when the line is thus secured.

6 Claims, 2 Drawing Sheets

BOAT-LINE TIE-OFF APPARATUS

FIELD OF THE INVENTION

This invention relates to marine pleasurecraft, in general, and to the tying of boat-lines on sail and power boats, in particular.

BACKGROUND OF THE INVENTION

As is known and understood, most owners of sail and power boats are fastidious in the maintenance and repairing of their pleasurecraft. It is not unusual, for example, to see such owners and their crews constantly scraping and scrubbing their boats, washing and polishing its exposed surfaces and components—even in those instances where the boats are tied up in a marina more than they are under sail or power. No matter how "neurotic" these boat owners might appear to be in ever cleaning and in ever polishing, their "babies", one aspect of the maintenance has never really been given due attention—namely, the lines that are used throughout the craft, and which secure the boat to its mooring, to the dock, or just to its anchor when allowing the craft to loll about. More specifically, as the ends of these lines tend to wear and unravel over time, the typical manner of dealing with such situation is to simply whip the line ends with any available tape or wax material that may be available. While the need continues to secure the ends of the lines so that they do not separate (as characteristic of a nylon or hemp line, for example), it will be appreciated that something more cosmetic would be desirable.

SUMMARY OF THE INVENTION

As will become clear from the following description, the boat-line tie-off apparatus of the invention satisfies this need through the use of a pair of cylinders, one of which (female) overlaps and fits over the second (male). By having a series of compressible fingers extending inwardly from an outside surface of the male cylinder, and by having both the outside surface of the male cylinder and the inside surface of the female cylinder appropriately threaded, the effective screwing of the female cylinder onto the male cylinder produces a force upon the compressible fingers to the extent that any line inserted into the male cylinder becomes clamped thereby and held in position. By having the cylinders fabricated of plastic, a combined housing could thus be appropriately selected to provide an overall, generally attractive appearance to the manner in which the threading takes place.

In accordance with a preferred embodiment of the invention, three such compressible fingers are included, spaced at substantially 120° intervals about the outside surface of the male cylinder. When selected of an inside diameter to receive boat-lines of commonly employed sizes, a ⅜", ½", ⅝", ¾", or 1" male-female cylinder combination follows, to provide a better looking housing to tie-off the line. Whether the cylinders be fabricated of plastic, or of a different material—and whether or not these sizes are used—, the holding force which results is at least comparable to the whipping of the line with tape, or with a melted wax fabrication.

BRIEF DESCRIPTION OF THE DRAWING

These and other features of the present invention will be more clearly understood from a consideration of the following description, taken in connection with the accompanying drawing, in which.

DETAILED DESCRIPTION OF THE DRAWING

Figure 1A:
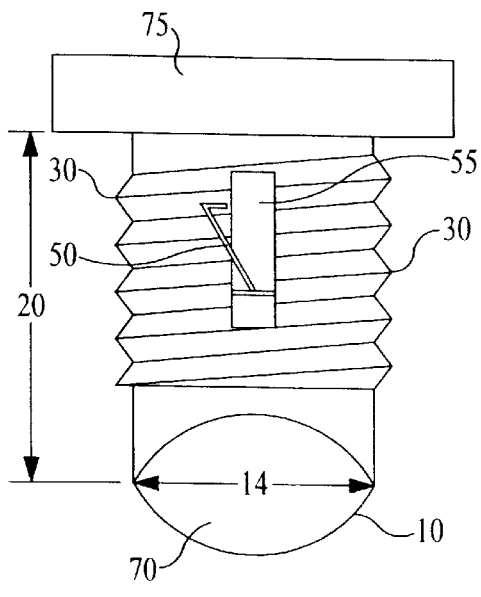
FIGS. 1A and 1B respectively illustrate the male and female cylinders arranged for cooperation as the boat—line tie—off apparatus according to the invention.
Figure 1B:
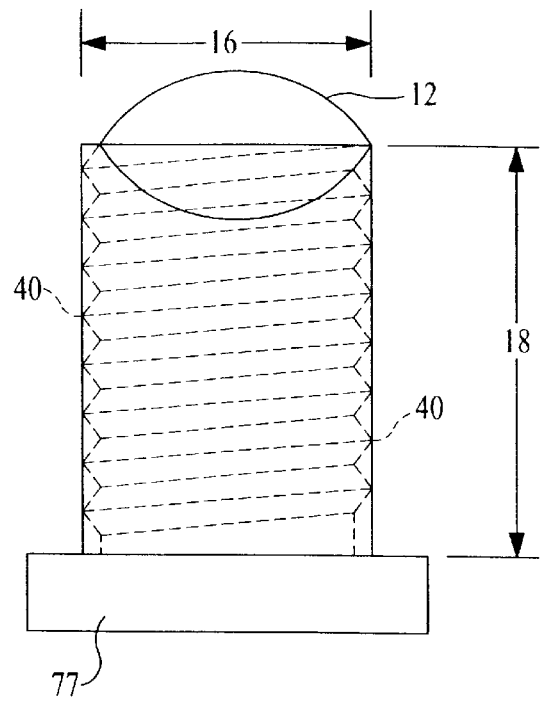

The male cylinder 10 and the female cylinder 12 are preferably fabricated of a plastic material, with the inside diameter 14 of the male cylinder 10 being less than the inside diameter 16 of the female cylinder 12. In a preferred embodiment of the invention, the height 18 of the female cylinder 12 is slightly greater than the height 20 of the male cylinder 10. In this manner, once the female cylinder 12 receives the male cylinder 10, the appearance presented by the two cylinders in combination is substantially only that of the female cylinder 12.

As illustrated at 30 and 40, the male cylinder 10 is provided with a series of outer threads, while the female cylinder 12 is provided with a series of inner threads. In particular, the pitch, amplitude and frequency of the two series of threads 30, 40 are selected substantially equal—so that the female cylinder 12 can be effectively threaded over the male cylinder 10 to receive it, allowing the two cylinders to be effectively screwed together. As will be appreciated by the skilled artisan, this follows by having the inside surface of the female cylinder 12 of a slightly greater diameter than the outside surface of the male cylinder 10 at the location of the inner and outer threads 40, 30.

Figure 2:
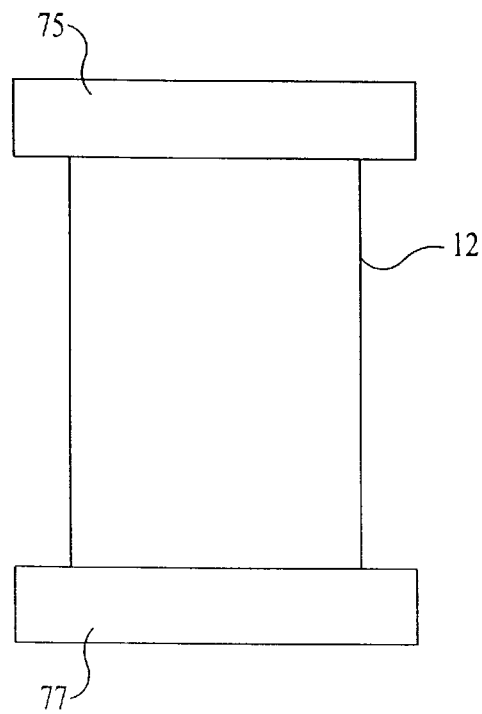
FIG. 2 shows the male and female cylinders once screwed together, as helpful in an understanding of the teachings of the preferred embodiment.
Figure 3A:
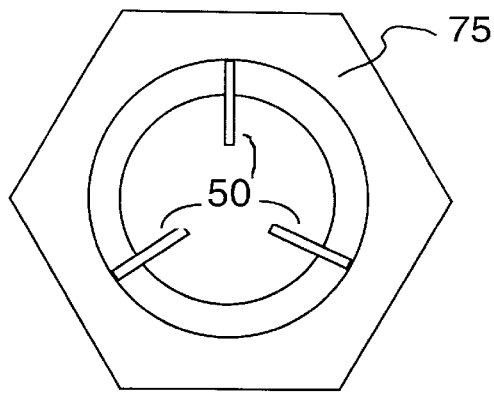
FIGS. 3A and 3B respectively illustrate top and bottom views of the male and female cylinders of FIGS. 1A and 1B.
Figure 3B:
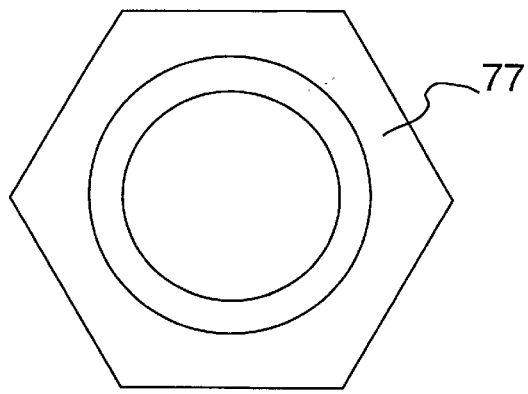
Figure 4:
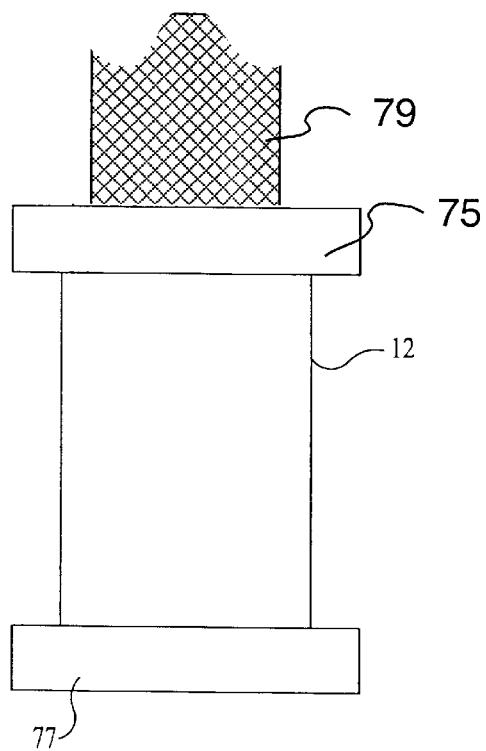
FIG. 4 shows the male and female cylinders screwed together in holding a boat-line in position, while keeping it from fraying or unwinding in accordance with the preferred embodiment of the invention.

In accordance with the invention, furthermore, a plurality of compressible fingers or resilient rods 50 extend inwardly from the outside surface of the male cylinder 10 at angularly spaced locations about the outside surface. One such location is shown at the slot 55—and in a preferred embodiment of the invention, three such locations are positioned at 120° intervals around the outside surface of the cylinder 10. The slot 55 consists of a downwardly deformable flap carrying the compressible finger (or rod) 50 at its underside—and, in this manner, operates to downwardly force the fingers into the cylinder 10 as the female cylinder 12 is screwed onto the male cylinder. The fit between the two cylinders when threaded this way forces the compressible fingers 50 inwardly to clamp onto and hold fast, any boat-line of a marine pleasure craft inserted within the inside surface of the male cylinder, as shown at 70. The two cap portions 75, 77 close off the cylinders 10, 12 when screwed together, to provide the final appearance of the construction, as shown in FIG. 2. This tightening of the female cylinder 12 onto the male cylinder 10 thus forces the compressible fingers or rods 50 to penetrate the line 79, in holding the line 79 in position, as well as keeping the line from fraying or unwinding over use. At the same time, a more pleasing appearance is presented.

While applicant does not wish to be limited to any particular set of values, the male and female cylinders could be appropriately dimensioned to receive boat-lines of the commonly employed sizes of ⅜", ½", ⅝", ¾", or 1". At the same time, appreciating that the height 18 of the female cylinder 12 is slightly greater than the height 20 of the male cylinder 10, these heights can be nominally selected of substantially 1 ½" dimension.

While there has been described what is considered to be a preferred embodiment of the present invention, it will be readily appreciated by those skilled in the art that modifications can be made without departing from the scope of the teachings herein. For at least such reasons, therefore, resort should be had to the claims appended hereto for a true understanding of the scope of the invention.

What is claimed is:

1. Boat-line tie-off apparatus comprising:

a first cylinder having an inside surface, and also having an outside surface threaded of predetermined pitch, amplitude and frequency;

a second cylinder having an outside surface, and also having an inside surface threaded of corresponding pitch, amplitude and frequency as said outside surface of said first cylinder;

a plurality of compressible fingers extending inwardly of said first cylinder from said threaded outside surface;

and with said threaded inside surface of said second cylinder being of slightly greater diameter than said threaded outside surface of said first cylinder;

whereby, when threading said second cylinder onto said first cylinder, the fit therebetween forces said compressible fingers further inwardly to clamp onto, and hold fast, a boat-line fitted within said first cylinder; and wherein said plurality of compressible fingers include a plurality of resilient rods inwardly deformable upon the application of an applied force exerted thereon.

2. The apparatus of claim 1 wherein said plurality of resilient rods include 3 in number, spaced at substantially 120° intervals about said outer surface of said first cylinder.

3. The apparatus of claim 2 wherein said first and second cylinders are composed of a plastic material.

4. The apparatus of claim 2 wherein there is also included a boat-line of a marine pleasurecraft inserted within said first cylinder.

5. The apparatus of claim 2 wherein said first cylinder is of a diameter selected from one of the sizes ⅜", ½", ⅝", ¾" and 1".

6. The apparatus of claim 5 wherein each of said first and second cylinders is selected substantially of a height of 1½".

* * * * *